United States Patent
Sjodin et al.

(10) Patent No.: US 9,513,743 B2
(45) Date of Patent: Dec. 6, 2016

(54) METHODS FOR DRIVING ELECTRO-OPTIC DISPLAYS

(71) Applicant: E INK CORPORATION, Cambridge, MA (US)

(72) Inventors: Theodore H. Sjodin, Lexington, MA (US); Yuval Ben-Dov, Cambridge, MA (US); Kenneth R. Crounse, Somerville, MA (US); Jason Lin, Malden, MA (US); Karl Raymond Amundson, Cambridge, MA (US); Michael Patrick Almon, Brighton, MA (US); Hugh M. Enxing, Medford, MA (US); Timothy J. O'Malley, Jr., Wakefield, MA (US)

(73) Assignee: E Ink Corporation, Billerica, MA (US)

( * ) Notice: Subject to any disclaimer, the term of this patent is extended or adjusted under 35 U.S.C. 154(b) by 205 days.

(21) Appl. No.: 13/898,592

(22) Filed: May 21, 2013

(65) Prior Publication Data

US 2013/0321278 A1 Dec. 5, 2013

Related U.S. Application Data

(60) Provisional application No. 61/654,783, filed on Jun. 1, 2012.

(51) Int. Cl.
```
G06F 3/042      (2006.01)
G06F 3/041      (2006.01)
G02B 26/00      (2006.01)
G06F 3/02       (2006.01)
```
(52) U.S. Cl.
CPC ............ *G06F 3/042* (2013.01); *G02B 26/005* (2013.01); *G06F 3/02* (2013.01); *G06F 3/0412* (2013.01)

(58) Field of Classification Search
CPC .......... G06F 3/02; G06F 3/002; G06F 3/042; G06F 3/0412; G06F 3/0416; G06F 3/04886; G02F 3/022; G02F 1/167; G02F 1/13338; G02F 1/172; G02F 1/15; G09G 3/344; G09G 3/3446; G09G 2310/068; G09G 2310/06; G09G 2310/061; G09G 2340/14; G09G 2354/00; G09F 9/372; G02B 26/00; G02B 26/005; G02B 26/026
See application file for complete search history.

(56) References Cited

U.S. PATENT DOCUMENTS

| | | |
|---|---|---|
| 4,418,346 A | 11/1983 | Batchelder |
| 5,760,761 A | 6/1998 | Sheridon |

(Continued)

OTHER PUBLICATIONS

Kitamura, T., et al., "Electrical toner movement for electronic paper-like display", Asia Display/IDW '01, p. 1517, Paper HCS1-1 (2001).

(Continued)

*Primary Examiner* — Dwayne Bost
*Assistant Examiner* — Ivelisse Martinez Quiles
(74) *Attorney, Agent, or Firm* — Brian D. Bean

(57) ABSTRACT

A touch screen electro-optic display is arranged such that upon a touch being detected on the display surface, the display surface surrounding the touch "blinks" by being driven to a different optical state, then back to its original state. A second method uses a display having a pen or stylus which can draw lines upon the display. A first line segment is detected and its area updated using a first drive scheme having short waveforms. The area of a second line segment is updated using the first drive scheme. Thereafter, the areas of both line segments are updated using a second drive scheme different from the first drive scheme.

7 Claims, 1 Drawing Sheet

(56) References Cited

U.S. PATENT DOCUMENTS

| | | |
|---|---|---|
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,184,856 B1 | 2/2001 | Gordon, II et al. |
| 6,225,971 B1 | 5/2001 | Gordon, II et al. |
| 6,241,921 B1 | 6/2001 | Jacobson et al. |
| 6,271,823 B1 | 8/2001 | Gordon, II et al. |
| 6,301,038 B1 | 10/2001 | Fitzmaurice et al. |
| 6,392,786 B1* | 5/2002 | Albert ............... 345/107 |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,866,760 B2 | 3/2005 | Paolini, Jr. et al. |
| 6,870,657 B1 | 3/2005 | Fitzmaurice et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2* | 3/2006 | Zehner et al. ............... 345/214 |
| 7,023,420 B2 | 4/2006 | Comiskey et al. |
| 7,034,783 B2 | 4/2006 | Gates et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,170,670 B2 | 1/2007 | Webber |
| 7,193,625 B2 | 3/2007 | Danner et al. |
| 7,202,847 B2 | 4/2007 | Gates |
| 7,205,983 B2 | 4/2007 | Raap |
| 7,236,291 B2 | 6/2007 | Kaga et al. |
| 7,259,744 B2 | 8/2007 | Arango et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,545,358 B2 | 6/2009 | Gates et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,814 B2 | 3/2010 | Paolini, Jr. et al. |
| 7,688,297 B2 | 3/2010 | Zehner et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,787,169 B2 | 8/2010 | Abramson et al. |
| 7,839,564 B2 | 11/2010 | Whitesides et al. |
| 7,952,557 B2 | 5/2011 | Amundson et al. |
| 7,956,841 B2 | 6/2011 | Albert et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,289,250 B2 | 10/2012 | Zehner et al. |
| 8,300,006 B2 | 10/2012 | Zhou et al. |
| 8,305,341 B2 | 11/2012 | Arango et al. |
| 8,314,784 B2 | 11/2012 | Ohkami et al. |
| 8,319,759 B2 | 11/2012 | Jacobson et al. |
| 8,384,658 B2 | 2/2013 | Albert et al. |
| 8,558,783 B2 | 10/2013 | Wilcox et al. |
| 8,558,785 B2 | 10/2013 | Zehner et al. |
| 8,593,396 B2 | 11/2013 | Amundson et al. |
| 8,754,859 B2 | 6/2014 | Gates et al. |
| 8,928,562 B2 | 1/2015 | Gates et al. |
| 2003/0102858 A1 | 6/2003 | Jacobson et al. |
| 2003/0137521 A1* | 7/2003 | Zehner ............... G02F 1/167 345/589 |
| 2004/0135818 A1* | 7/2004 | Thomson et al. ............ 345/823 |
| 2005/0231461 A1* | 10/2005 | Raap et al. ............... 345/107 |
| 2005/0253777 A1 | 11/2005 | Zehner et al. |
| 2007/0091418 A1 | 4/2007 | Danner et al. |
| 2007/0103427 A1 | 5/2007 | Zhou et al. |
| 2007/0205978 A1* | 9/2007 | Zhou et al. ............... 345/107 |
| 2008/0024429 A1 | 1/2008 | Zehner |
| 2008/0024482 A1 | 1/2008 | Gates et al. |
| 2008/0136774 A1 | 6/2008 | Harris et al. |
| 2008/0291129 A1 | 11/2008 | Harris et al. |
| 2009/0174651 A1 | 7/2009 | Jacobson et al. |
| 2009/0179923 A1 | 7/2009 | Amundson et al. |
| 2009/0195568 A1* | 8/2009 | Sjodin ............... 345/690 |
| 2009/0322721 A1 | 12/2009 | Zehner et al. |
| 2010/0220121 A1 | 9/2010 | Zehner et al. |
| 2010/0265561 A1 | 10/2010 | Gates et al. |
| 2010/0271313 A1* | 10/2010 | Low et al. ............... 345/173 |
| 2010/0299599 A1* | 11/2010 | Shin et al. ............... 345/173 |
| 2011/0012921 A1* | 1/2011 | Cholewin et al. ............ 345/173 |
| 2011/0057896 A1* | 3/2011 | Baek ............... 345/173 |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0201387 A1* | 8/2011 | Paek et al. ............... 345/168 |
| 2011/0261031 A1* | 10/2011 | Muto ............... G06F 3/0412 345/107 |
| 2011/0285754 A1 | 11/2011 | Harrington et al. |
| 2011/0298739 A1* | 12/2011 | Wu et al. ............... 345/173 |
| 2011/0310459 A1* | 12/2011 | Gates et al. ............... 359/296 |
| 2012/0054671 A1 | 3/2012 | Thompson |
| 2012/0098741 A1* | 4/2012 | Kim et al. ............... 345/107 |

OTHER PUBLICATIONS

Yamaguchi, Y., et al., "Toner display using insulative particles charged triboelectrically", Asia Display/IDW '01, p. 1729, Paper AMD4-4 (2001).

Hayes, R.A., et al., "Video-Speed Electronic Paper Based on Electrowetting", Nature, vol. 425, Sep. 25, pp. 383-385 (2003).

* cited by examiner

 
Fig. 1A                           Fig. 1B
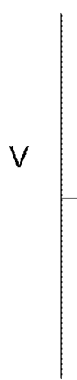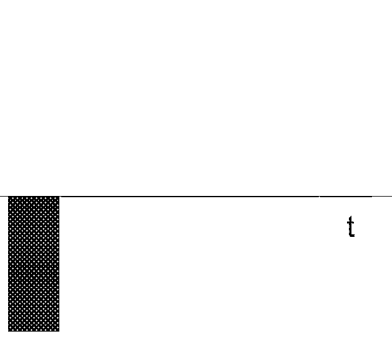 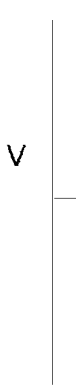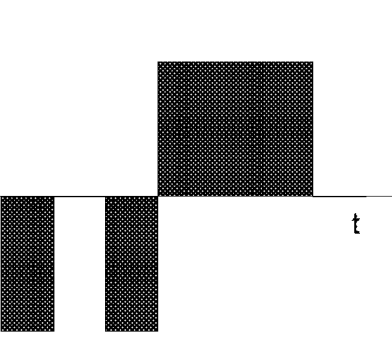
Fig. 2A                           Fig. 2B
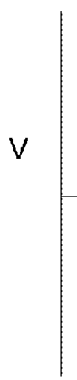 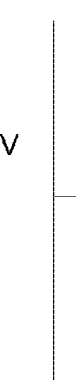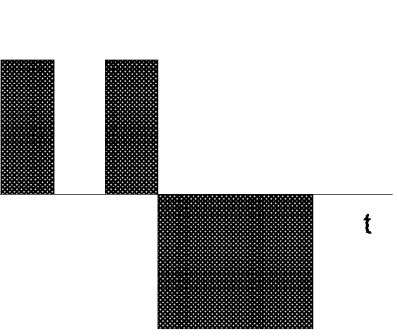
Fig. 2C                           Fig. 2D

METHODS FOR DRIVING ELECTRO-OPTIC DISPLAYS

REFERENCE TO RELATED APPLICATIONS

This application claims benefit of Application Ser. No. 61/654,783, filed Jun. 1, 2012.

This application is also related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,116,466; 7,119,772; 7,193,625; 7,202,847; 7,259,744; 7,304,787; 7,312,794; 7,327,511; 7,453,445; 7,492,339; 7,528,822; 7,545,358; 7,583,251; 7,602,374; 7,612,760; 7,679,599; 7,688,297; 7,729,039; 7,733,311; 7,733,335; 7,787,169; 7,952,557; 7,956,841; 7,999,787; 8,077,141; 8,125,501; 8,139,050; 8,174,490; 8,289,250; 8,300,006; and 8,314,784; and U.S. Patent Applications Publication Nos. 2003/0102858; 2005/0122284; 2005/0179642; 2005/0253777; 2007/0091418; 2007/0103427; 2008/0024429; 2008/0024482; 2008/0136774; 2008/0150888; 2008/0291129; 2009/0174651; 2009/0179923; 2009/0195568; 2009/0322721; 2010/0045592; 2010/0220121; 2010/0220122; 2010/0265561; 2011/0187684; 2011/0193840; 2011/0193841; 2011/0199671; and 2011/0285754.

The aforementioned patents and applications may hereinafter for convenience collectively be referred to as the "MEDEOD" (MEthods for Driving Electro-Optic Displays) applications. The entire contents of these patents and copending applications, and of all other U.S. patents and published and copending applications mentioned below, are herein incorporated by reference.

BACKGROUND OF INVENTION

The present invention relates to methods for driving electro-optic displays, especially bistable electro-optic displays, and to apparatus for use in such methods. More specifically, this invention relates to driving methods which may be useful in displays having touch screens. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783;

5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;
(b) Capsules, binders and encapsulation processes; see for example U.S. Pat. Nos. 6,922,276; and 7,411,719;
(c) Films and sub-assemblies containing electro-optic materials; see for example U.S. Pat. Nos. 6,982,178; and 7,839,564;
(d) Backplanes, adhesive layers and other auxiliary layers and methods used in displays; see for example U.S. Pat. Nos. 7,116,318; and 7,535,624;
(e) Color formation and color adjustment; see for example U.S. Pat. No. 7,075,502; and U.S. Patent Application Publication No. 2007/0109219;
(f) Methods for driving displays; see the aforementioned MEDEOD applications;
(g) Applications of displays; see for example U.S. Pat. No. 7,312,784; and U.S. Patent Application Publication No. 2006/0279527; and
(h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see, for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

The bistable or multi-stable behavior of particle-based electrophoretic displays, and other electro-optic displays displaying similar behavior (such displays may hereinafter for convenience be referred to as "impulse driven displays"), is in marked contrast to that of conventional liquid crystal ("LC") displays. Twisted nematic liquid crystals are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

Under some circumstances, it may be desirable for a single display to make use of multiple drive schemes. For example, a display capable of more than two gray levels may make use of a gray scale drive scheme ("GSDS") which can effect transitions between all possible gray levels, and a monochrome drive scheme ("MDS") which effects transitions only between two gray levels, the MDS providing quicker rewriting of the display that the GSDS. The MDS is used when all the pixels which are being changed during a rewriting of the display are effecting transitions only between the two gray levels used by the MDS. For example, the aforementioned U.S. Pat. No. 7,119,772 describes a display in the form of an electronic book or similar device capable of displaying gray scale images and also capable of displaying a monochrome dialogue box which permits a user to enter text relating to the displayed images. When the user is entering text, a rapid MDS is used for quick updating of the dialogue box, thus providing the user with rapid confirmation of the text being entered. On the other hand, when the entire gray scale image shown on the display is being changed, a slower GSDS is used.

Alternatively, a display may make use of a GSDS simultaneously with a "direct update" drive scheme ("DUDS"). The DUDS may have two or more than two gray levels, typically fewer than the GSDS, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level; in some cases, the transition may be effected by driving from the initial gray level to one extreme optical state, thence to the opposed extreme optical state, and only then to the final extreme optical state—see, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

Variation in drive schemes is, however, not confined to differences in the number of gray levels used. For example, drive schemes may be divided into global drive schemes, where a drive voltage is applied to every pixel in the region to which the global update drive scheme (more accurately referred to as a "global complete" or "GC" drive scheme) is being applied (which may be the whole display or some defined portion thereof) and partial update drive schemes, where a drive voltage is applied only to pixels that are undergoing a non-zero transition (i.e., a transition in which the initial and final gray levels differ from each other), but no drive voltage is applied during zero transitions (in which the initial and final gray levels are the same). An intermediate form a drive scheme (designated a "global limited" or "GL" drive scheme) is similar to a GC drive scheme except that no drive voltage is applied to a pixel which is undergoing a zero, white-to-white transition. In, for example, a display used as an electronic book reader, displaying black text on a white background, there are numerous white pixels, especially in the margins and between lines of text which remain unchanged from one page of text to the next; hence, not rewriting these white pixels substantially reduces the apparent "flashiness" of the display rewriting. However, certain problems remain in this type of GL drive scheme. Firstly, as discussed in detail in some of the aforementioned MEDEOD applications, bistable electro-optic media are typically not completely bistable, and pixels placed in one extreme optical state gradually drift, over a period of minutes to hours, towards an intermediate gray level. In particular, pixels driven white slowly drift towards a light gray color. Hence, if in a GL drive scheme a white pixel is allowed to remain undriven through a number of page turns, during which other white pixels (for example, those forming parts of the text characters) are driven, the freshly updated white pixels will be slightly lighter than the undriven white pixels, and eventually the difference will become apparent even to an untrained user.

Secondly, when an undriven pixel lies adjacent a pixel which is being updated, a phenomenon known as "blooming" occurs, in which the driving of the driven pixel causes a change in optical state over an area slightly larger than that of the driven pixel, and this area intrudes into the area of adjacent pixels. Such blooming manifests itself as edge effects along the edges where the undriven pixels lie adjacent driven pixels. Similar edge effects occur when using regional updates (where only a particular region of the display is updated, for example to show an image), except that with regional updates the edge effects occur at the boundary of the region being updated. Over time, such edge effects become visually distracting and must be cleared. Hitherto, such edge effects (and the effects of color drift in undriven white pixels) have typically been removed by using a single GC update at intervals. Unfortunately, use of such an occasional GC update reintroduces the problem of a "flashy" update, and indeed the flashiness of the update may be heightened by the fact that the flashy update only occurs at long intervals.

An additional complication in devising drive schemes for bistable electro-optic displays is the need for overall DC balance. As discussed in many of the aforementioned MEDEOD applications, the electro-optic properties and the working lifetime of displays may be adversely affected if the drive schemes used are not substantially DC balanced (i.e., if the algebraic sum of the impulses applied to a pixel during any series of transitions beginning and ending at the same gray level is not close to zero). See especially the aforementioned U.S. Pat. No. 7,453,445, which discusses the problems of DC balancing in so-called "heterogeneous loops" involving transitions carried out using more than one drive scheme. A DC balanced drive scheme ensures that the total net impulse bias at any given time is bounded (for a finite number of gray states). In a DC balanced drive scheme, each optical state of the display is assigned an impulse potential (IP) and the individual transitions between optical states are defined such that the net impulse of the transition is equal to the difference in impulse potential between the initial and final states of the transition. In a DC balanced drive scheme, any round trip net impulse is required to be substantially zero.

It is known (see for example U.S. Patent Application Publication No. 2011/0310459 and patents and application mentioned therein) to provide electro-optic displays with touch screens. Many display applications benefit from touch sensitivity. In many cases, touch sensitivity in a limited number of fixed areas can be used for elements of the user interface. Alternatively, applications such as drawing, underlining, or complex and changeable user interfaces benefit from a full touch screen. Touch sensing capabilities also offer the possibility of producing an electronic paper-like display which mimics not only the readability but also the writeability of conventional paper. The ability to detect, at frequent intervals, the position of a finger or stylus on a display screen, enables a display to use the position information to effect selection of menu items or to capture handwriting as "digital ink".

Although touch sensing is not strictly a display function, the touch sensor is typically considered part of the display because it must be co-located with the display (either above or below the display surface). Unfortunately, most touch screen technologies are not suitable for use with portable products using electrophoretic displays. Of the types of touch screen which are inexpensive, compact, and sufficiently low in power demand to address such displays, many require multiple layers and/or interfaces to be stacked on top of the display medium. Since electrophoretic displays are reflective, optical performance is reduced by each additional layer and interface interposed between the electro-optic layer and the user. Many types of touch screen also add excessive thickness to the display stack, and require multiple additional processing steps to form the complete display panel.

Inductive touch screens can be placed behind the backplane layer (i.e., on the opposed side of the backplane to both the user and the electro-optic medium), and thus do not affect optical performance. Such inductive touch screens also add minimal thickness, but they are expensive and require use of a special stylus.

Surface capacitive touch screens are a promising avenue for use with electro-optic displays. This type of touch screen is typically laminated or positioned over the front of a finished display. See the aforementioned 2011/0310459.

One problem with touch screens is the lack of user feedback to confirm to the user that he has correctly touched the screen. For example, a touch screen can be used as a virtual keyboard to enable text input to a display which is not equipped with a normal keyboard. A virtual keyboard typically comprises of a series of areas delineated by a grid of lines and marked with letters, numbers and other symbols so as to imitate a typical physical keyboard. Each symbol is entered by pressing the relevant area. However, in a virtual keyboard there is no equivalent of the tactile or audile feedback provided by a physical keyboard, so unless the user watches the text input box as each letter is entered (and this is often inconvenient), it is difficult to know when a letter has been successfully entered. Furthermore, there are situations where display of the entered symbol may be delayed for a short time because the display is busy performing other functions, such as downloading an image from a server, or receiving input from a wireless or internet connection. Similar problems arise when using other types of touch screen input, for example when selecting one of a series of buttons in an on-screen menu.

The present invention relates to a method of driving a bistable display which enables the display itself to provide feedback to acknowledge user input.

A similar problem arises when a bistable display is being used with an input device such as a stylus or pen, which is intended to enable the user to draw lines on the display. In practice, it is difficult to use such an input device effectively unless the user can see, within a very limited time, the line he is "drawing" on the display. However, the delay between the actual drawing of a line segment and its appearance on the display is approximately equal to the switching time of the display medium (the period which the display takes to shift from a black optical state to a white one or vice versa) and as already indicated this is normally at least 250 milliseconds and may be substantially greater at low temperatures. (As discussed in some of the aforementioned MEDEOD applications, the switching times of electrophoretic and some other types of electro-optic medium increase at low temperatures.) Note that the switching time is much greater than the frame time (the period which an active matrix display takes to scan all the pixels in a display), so that, once initiated, an update of an area, such as a line segment, needs to continue to be driven for a large number of frames (e.g. 21 frames for an update time of 250 milliseconds at a scan rate of 85 Hz). If, as is desirable, a new line segment is begun at every frame (so that there is no more than one frame's delay in indicating the new stylus position), a new line segment is begun at every frame. Each new line segment is a separate area for updating purposes and needs to be handled separately by the display controller. In the language normally used in the display industry, each new line segment requires a dedicated pipeline within the controller. Thus, if for example a new line segment is begun with each frame, and each of the resultant line segments needs to be driven for 21 frames, as discussed above, the display controller would need to dedicate 21 pipelines just to handle the line segments, in addition to any pipelines needed to handle other changes to the display. Furthermore, for reasons already discussed, the number of pipelines needed to handle the line segments would greatly increase if the display is operated at low temperature. This is not possible with commercial display controllers, which are typically limited to 16 pipelines in total.

Accordingly, there is a need for a method of tracking stylus or pen input on a display which will enable rapid tracking of the stylus or pen but which can be executed within the limitations of present display controllers.

SUMMARY OF INVENTION

Accordingly, in one aspect, this invention provides a method of driving an electro-optic display having means for detecting touches on a display surface, the display being arranged such that upon a touch being detected on the display surface, a portion of the display surface surrounding the touch is driven from its previous optical state to a different optical state (the "blink state") and then returned to its previous optical state. In effect, the driving method of the present invention causes an area surrounding the point touched (hereinafter for convenience called the "touch area") to "blink". This aspect of the present invention may hereinafter for convenience be referred to as the "blinking area" method of the invention.

There are two principal forms of the blinking area method. In the first form, the touch area only assumes the blink state for a brief period of time, and then automatically reverts to the previous optical state. In the second form, the touch area assumes the blink state and remains in this blink state until a further transition (i.e., rewriting of the display) which may or may not depend upon further user input. For example, if the present method is being used to provide feedback regarding typing on a virtual keyboard, the reverse transition from the blink state to the previous state may be triggered by the user pressing another key on the virtual keyboard. (The term "virtual keyboard" is intended to be interpreted broadly to cover any display which presents the user with a plurality of symbols displayed on discrete areas of the display such that pressing one of the discrete areas will cause a specific input to the display. Thus, the term "virtual keyboard" covers not only a virtual version of a conventional typewriter keyboard, with the letters of an alphabet, optionally supplemented by numbers and/or punctuation marks, but also for example, a numeric key pad and a schematic diagram of a network of piping with areas which can be pressed to open or close valves in the network.)

The shape of the touch area where blinking occurs is arbitrary and need not be rectangular. In many cases, as for example when the method is being used to provide feedback for typing on a virtual keyboard or for selection of one of a series of menu boxes, the predetermined area of the key or menu box touched provides a natural touch area. In other cases, for example where a point is being touched to indicate a location on a drawing, the touch area can be an arbitrary square centered on the actual touch point. (It might appear that a circle centered on the touch point would be a more logical touch area, and the present invention does not exclude this, but in practice on a conventional active matrix display it is much easier to select a square or rectangular area than a circular one.) However, in other applications non-rectangular touch areas may be useful. For example, if a touch is being used to select a location on a map, a cruciform touch area in the form of two narrow rectangles perpendicular to each other and intersecting at the touch point might be useful.

In another aspect, this invention provides a method of driving an electro-optic display provided with drawing means arranged to draw a line upon the display. The method comprises: detecting a first line segment drawn on the display by the drawing means; updating the area of the first line segment using a first drive scheme having waveforms shorter than the period required to completely switch the display between its extreme optical states; detecting a second line segment drawn on the display by the drawing means, the second line segment not overlapping the first line segment; updating the area of the second line segment using a first drive scheme; and after the areas of both the first and second line segments have been updated using the first drive scheme, updating the areas of both the first and second line segments using a second drive scheme different from the first drive scheme. This aspect of the present invention may hereinafter for convenience be referred to as the "line segment update" method of the invention.

In this line segment update method, the second drive scheme may have a maximum update time longer than that of the first drive scheme. Also, after the areas of both the first and second line segments have been updated using the first drive scheme, the areas of both the first and second line segments may be updated using a third drive scheme different from both the first and second drive schemes.

The driving method of the present invention may be used with any of types of bistable electro-optic media previously described. Thus, the electro-optic medium may comprise a rotating bichromal member, electrochromic or electro-wetting material. Alternatively, the electro-optic medium may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

The present invention also extends to display controllers and displays arranged to carry out either of the methods of the present invention.

BRIEF DESCRIPTION OF THE DRAWINGS

FIGS. 1A and 1B of the accompanying drawings illustrate waveforms for a monochrome blinking drive scheme useful in the first form of the blinking area method of the present invention.

FIGS. 2A-2D illustrate waveforms for a blinking drive scheme useful in the second form of the blinking area method of the present invention.

DETAILED DESCRIPTION

As already mentioned, the present invention provides two different methods of updating an electro-optic display, typically a bistable electro-optic display, namely the blinking area and line segment update methods of the invention. These two methods will mainly be described separately below, but it should be appreciated that a single physical display may incorporate both method of the present invention.

Part A: Blinking Area Method of the Invention

As noted above, the blinking area method of the present invention uses an electro-optic display having means for detecting touches on a display surface. The display is arranged such that upon a touch being detected on the display surface, a portion of the display surface surrounding the touch is driven from its previous optical state to a different optical state (the "blink state") and then returned to its previous optical state, so that an area surrounding the point touched (the "touch area") blinks. Also, as already noted, there are two principal forms of the blinking area method. In the first form, the touch area only assumes the blink state for a brief period of time, and then automatically reverts to the previous optical state. In the second form, the touch area assumes the blink state and remains in this blink state until a further transition which may or may not depend upon further user input.

In practice, the first form of the blinking area method requires the use of at least two drive schemes, one of which is a standard gray scale drive scheme (this could be a two gray level, i.e., monochrome, drive scheme but typically will involve a larger number of gray levels), this drive scheme being used for transitions other than those which require blinking. As should readily be apparent from the foregoing discussion, more than one non-blinking drive scheme may be used. The second drive scheme is used for transitions where blinking is required. Several variations of such a blinking drive scheme are possible. If, for example, only a monochrome portion of the image requires blinking (for example, a virtual keyboard might often be monochrome), the blinking drive scheme would only need to specify waveforms for white=>white and black=>black transitions; it will be recalled that the blinking drive scheme is only designed to blink the touch area and not to change the image therein. Alternatively, if a gray scale portion of the image is to be blinked (for example to indicate a touch on a map, which will typically be rendered in gray scale), the blinking drive scheme needs to specify waveforms for all zero transitions (i.e., transitions in which the initial and final states of the pixel are the same). For example, a 16 gray level blinking drive scheme would contain waveforms for 0=>0, 1=>1, 2=>2, . . . 15=>15, where 0-15 denote the 16 gray levels.

Although the aforementioned MEDEOD patents and applications stress the need for drive schemes for bistable electro-optic displays, and especially electrophoretic displays, to be DC balanced (in the sense that the total electrical impulse applied in any series of transitions beginning and ending at the same gray level is substantially zero), it has been found that it not absolutely necessary that the blinking drive scheme used in the present method be DC balanced; in practice, the number of times in which a pixel is subjected to a non-DC balanced drive scheme during typical operation of a display is sufficiently small that the resulting DC imbalance is not usually sufficient to cause major problems in most displays. However, in general it is preferred that the blinking drive scheme be DC balanced, and in practice this is not usually difficult to achieve. For example, many active matrix electro-optic displays use a simple tri-level drive scheme in which, during each scan of the display, a pixel is held at −V, 0 or +V relative to the common front electrode, so that the voltage against time graph for a given pixel consists of a series of rectangular drive pulses each having a duration of one scanning period. To produce a DC balanced blinking drive scheme, it is only necessary to ensure that there are an equal number of +V and −V drive pulses in each waveform. The duration of the blinking waveforms could be adjusted to be very short (about 60 ms) or as long as a gray level waveform (typically about 600 ms). Examples of suitable waveforms of this type for a monochrome blinking drive scheme are shown in FIGS. 1A and 1B of the accompanying drawings, with FIG. 1A showing the black=>black waveform and FIG. 1B the white=>white waveform. It will be seen that the black=>black waveform begins with a white-going pulse, which turns the pixel dark gray, at which level it remains for most of duration of the waveform. This is followed by a black-going pulse, a white-going pulse and a second black-going pulse, the net effect of which is to return the pixel to black. The white=>white waveform is essentially the same, except that the polarities of the drive pulses are reversed.

As already noted, in the blinking area method of the present invention, the blinking drive scheme is applied only to the touch area, the portion of the display which it is desired to blink to indicate that a touch has occurred. Blinking could occur with very low latency (i.e., with very little delay after the touch screen senses the touch) since the display image buffer does not have to be updated and the touch area of the display returns to the same optical state as before the blinking transition.

The second principal form of the blinking area method, in which the blinked state is maintained until a second transition, requires at least one gray scale drive scheme and (typically) a second blinking drive scheme consisting only of four waveforms, namely white to gray level A, gray level A to white, black to gray level B, and gray level B to black. Appropriate waveforms are shown in FIGS. 2A-2D respectively. It is believed that the transitions effected by these waveforms will readily be apparent from the explanation of FIGS. 1A and 1B given above.

From the foregoing, it will be seen that the blinking area method of the present invention provides a greatly improved user experience when a touch screen is used, either manually, or with a stylus or similar input device to provide input to a bistable electro-optic display.

Part B: Line Segment Update Method of the Invention

As already mentioned, the line segment update method of the present invention uses an electro-optic display (again, preferably a bistable electro-optic display) provided with drawing means arranged to draw a line upon the display. The method comprises: detecting a first line segment drawn on the display by the drawing means; updating the area of the first line segment using a first drive scheme having waveforms shorter than the period required to completely switch the display between its extreme optical states; detecting a second line segment drawn on the display by the drawing means, the second line segment not overlapping the first line segment; updating the area of the second line segment using a first drive scheme; and after the areas of both the first and second line segments have been updated using the first drive scheme, updating the areas of both the first and second line segments using a second drive scheme different from the first drive scheme.

The line segment update method of the present invention takes advantage of the fact that a user drawing a line on the display with a stylus, pen or similar device can perceive line segments already drawn with only a modest change in the optical state of the areas of the relevant line segments, even though the final marking of the line segment will require a substantially greater change in optical state. Accordingly, the line segment update method first updates the relevant area using a rapid waveform which needs to effect only sufficient change in optical state to make the line segment readily visible to a user. Since the waveform is rapid, it occupies only a small number of frames (perhaps 8 rather than the 21 in the typical prior art case discussed above), thus tying up only a small number of display controller pipelines in handling the initial updating of the line segments. Only after a number of line segments have completed this initial update, and a spare pipeline is available, are the whole set of line segments subjected to a second updating so that they assume their final state in which the final form of the shown.

More specifically, the simplest implementation of the line segment update method attempts to solve the problem alluded to in the Background of the Invention section above by providing a first update to each line segment area that is shorter than the time required to completely switch any pixel of the display completely from white to black. Later, when a pipeline is available, a plurality of line segment areas that have undergone their first updates are "ganged" into a single second (or final) update that only requires one pipeline. The complete updating process (update time UT) can by symbolically represented by:

$$UT = UT1 + UT2$$

The initial update time UT1 is designed such that driving the display for time UT1 produces a significant optical response, and:

$$UT1/FT \leq NP$$

where FT is the frame time and NP is the number of available pipelines in the display controller. This two-stage update process enables stylus or pen input to produce smooth drawing with initial updates of new line segments starting at each frame time. Then, optionally when there is a pause in line drawing for at least one complete frame, all line segments that have been previously drawn and have completed their first update can be ganged together into a single final update over time UT2. If, as is desirable, UT2 is the same as UT1, the one pipeline required to effect the final update will become available at the same moment it would have been if it had been being used for an initial update.

The line segment update method can be generalized to use multiple stages of final update. In general let:

$$UT = UT1 + UT2 + \ldots + UTn$$

where:

$$UT2, \ldots, UTn \leq UT1 \text{ and}$$

$$UT1/FT \leq NP.$$

Then the same general update scheme can be used but with n−1 final update stages for each line segment. Obviously this requires more tracking by the pen-tracking/image-rendering software of the device, as well as an algorithm to determine the order in which partially updated line segment areas should be finally updated. This could also be accomplished by dedicated controller hardware.

To the end user, the pen-writing experience would only be slightly altered. When the user is drawing quickly, the display would render the line segments following the pen in low contrast; then, during pauses in drawing or when a line was finished, the whole line up to the area still undergoing an initial update would update further to a full contrast level. Finally, when drawing is concluded, those line segments that are finishing their first update would immediately continue onto their final update(s).

When using the line segment update method, NP−k pipelines of the display controller could be dedicated for the initial updating of the line segments, where k>0, and k pipelines could be dedicated to the final updates. This requires that:

$$UT1/FT \leq (NP-k).$$

In this variant of the line segment update method, the final update could be effected even when there is no break in pen writing. Furthermore, the final update could be as long as required to finish switching the display, i.e. UT2 could be longer than UT1. In particular, second updates can only be performed every UT2/k seconds. For example, a controller, with 16 pipelines for temporally overlapping updates, might have 15 pipelines dedicated to achieving initial updates and 1 to final updates; alternatively, 12 pipelines could be dedicated for initial updates and 4 to final updates.

Where there is more than one final update stage. NP1 pipelines can be dedicated toward achieving update UT1, NP2 for update UT2, ... NPK for update UTK, with the constraint that:

$$NP1 + NP2 + \ldots NPK \leq NP.$$

Desirably, NP1 should to be larger than the remaining NPk values (k>1).

It will be apparent to those skilled in the art that numerous changes and modifications can be made in the specific embodiments of the invention described above without departing from the scope of the invention. For example, although the blinking area method of the present invention has been described primarily with reference to touch screens, it will readily be apparent that similar methods could be used to provide other forms of user feedback, for example to improve visibility of the cursor of a mouse or similar user input device, or to blink an icon to indicate receipt of a new message. Similarly, the line segment method of the present invention could be used not merely for manually drawn lines produced by a stylus, pen or similar device, but could adapted for use with lines progressively "drawn" on the display by software. Accordingly, the whole of the foregoing description is to be interpreted in an illustrative and not in a limitative sense.

The invention claimed is:

1. A method of driving an electro-optic display having a display surface, the method comprising:
    detecting a touch upon the display surface:
    driving a portion of the electro-optic display surrounding the touch from its previous optical state to a different optical state; and
    automatically driving the portion of the electro-optic display surrounding the touch from the different optical state to its previous optical state,
    wherein an overall drive scheme for driving the portion of the electro-optic display surrounding the touch from its previous optical state to the different optical state and back to its previous optical state is direct current (DC) balanced,
    wherein the overall drive scheme for driving the portion of the electro-optic display surrounding the touch from its previous optical state to the different optical state and back to its previous optical state is between 60 milliseconds (ms) and 250 ms in total length, and
    wherein the electro-optic display comprises an electrophoretic material comprising a plurality of electrically charged particles disposed in a fluid and capable of moving through the fluid under the influence of an electric field.

2. The method according to claim 1 wherein the portion of the electro-optic display surrounding the touch is substantially cruciform and has a form of two rectangles intersecting at a point that corresponds to the touch.

3. The method according to claim 1 wherein the electrically charged particles and the fluid are confined within a plurality of capsules or microcells.

4. The method according to claim 1 wherein the electrically charged particles and the fluid are present as a plurality of discrete droplets surrounded by a continuous phase comprising a polymeric material.

5. The method according to claim 1 wherein the fluid is gaseous.

6. The method according to claim 1, wherein its previous optical state is a white state or a black state, and the different optical state is a gray state.

7. The method according to claim 1, wherein its previous optical state is a gray state and the different optical state is a white state or a black state.

* * * * *